(12) United States Patent
Eguchi

(10) Patent No.: US 7,364,789 B2
(45) Date of Patent: Apr. 29, 2008

(54) WIPING FILM

(75) Inventor: Hiroyuki Eguchi, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 10/451,167

(22) PCT Filed: Dec. 28, 2001

(86) PCT No.: PCT/US01/50827

§ 371 (c)(1), (2), (4) Date: Jun. 19, 2003

(87) PCT Pub. No.: WO02/055266

PCT Pub. Date: Jul. 18, 2002

(65) Prior Publication Data

US 2004/0053042 A1 Mar. 18, 2004

(30) Foreign Application Priority Data

Jan. 10, 2001 (JP) .............................. 2001-002496

(51) Int. Cl.
*B32B 5/16* (2006.01)

(52) U.S. Cl. ...................................... 428/323; 428/327

(58) Field of Classification Search ................ 428/323, 428/327

See application file for complete search history.

(56) References Cited

U.S. PATENT DOCUMENTS

| | | | | |
|---|---|---|---|---|
| 3,958,064 A | * | 5/1976 | Brekken et al. | 428/336 |
| 4,490,762 A | * | 12/1984 | Akashi et al. | 360/128 |
| 5,213,588 A | | 5/1993 | Wong et al. | |
| 5,536,627 A | | 7/1996 | Wang et al. | |
| 5,556,691 A | * | 9/1996 | Etchu et al. | 428/141 |
| 5,695,386 A | * | 12/1997 | Ryoke et al. | 451/41 |

FOREIGN PATENT DOCUMENTS

| | | |
|---|---|---|
| DE | 31 11 032 | 1/1982 |
| EP | 0 845 491 | 6/1998 |
| FR | 1 250 711 | 1/1961 |
| JP | 05-066179 | 3/1993 |
| JP | 09-085628 | 3/1997 |
| JP | 10-071572 | 3/1998 |
| JP | 11-114837 | 4/1999 |

* cited by examiner

*Primary Examiner*—Monique R. Jackson
(74) *Attorney, Agent, or Firm*—Colene H. Blank; Daniel D. Biesterveld; James A. Baker

(57) ABSTRACT

A wiping film having a flexible film backing, and a wiping layer formed on one surface of the backing, wherein the wiping layer is composed of a binder and plastic particles dispersed therein. The wiping film is useful for removing foreign matter and loose lubricant from the treatment surface of a magnetic disk without generating any scratches or fiber particles thereon.

3 Claims, 1 Drawing Sheet

WIPING FILM

The present invention relates to a material used for finishing the surface of a magnetic recording medium, and more particularly concerns a wiping film that is used for a cleaning process and a burnishing process carried out on the surface of a magnetic disk.

BACKGROUND OF INVENTION

In recent years, along with the development of the information processing technology such as computers, magnetic recording media such as magnetic disks have been widely used as the external memory devices thereof.

In general, magnetic disks are formed as follows: a non-magnetic backing such as an aluminum alloy backing and glass backing is subjected to a sequence of surface treatments such as a lapping treatment, a polishing treatment and a texture treatment so that the surface becomes rough, and on the non-magnetic backing having the roughened surface is formed a magnetic recording layer, and on this magnetic recording layer is further formed a protective film made from carbon, $SiO_2$, etc.

After forming the protective film, a film cleaning process is carried out to remove protrusions formed on the surface of the protective film and foreign matters on the surface of the magnetic disk. This film cleaning process is generally carried out using an abrasive tape.

Following the cleaning process, a lubricant of fluorocarbon type is applied to to the protective film to form a lubricating film, and burnishing is carried out thereon to remove adhered matter such as dust on the surface of the magnetic recording medium. In general, this burnishing is also carried out by using an abrasive film. Thereafter, these are subjected to predetermined tests so as to produce magnetic recording medium in conformity with the standard.

Conventionally, with respect to films used for film cleaning and burnishing, a lapping film is used comprising abrasive grains such as alumina particles and SiC particles carried on a film made of a material, such as polyethylene terephthalate and polyamide. For example, Japanese Patent Laid-Open Publication No. 85628/1997, 71572/1998 and 114837/1999 have disclosed a lapping film having such a construction.

In recent years, in order to increase the memory capacity of a magnetic disk, the formation technique of protective films has been improved, and a shift has been made from the sputtering method to the chemical vapor deposition (CVD) method. Accordingly, it has become possible to provide a high precision and high quality film with high density and very thin film thickness. Moreover, the surface of the magnetic disk after the film formation becomes more uniform and more clean, thereby making it possible to provide a high quality disk (with less abnormally grown protrusions and reduced number of dust particles generated during the film formation).

Along with the development of the high quality formation film, the lapping film used for film cleaning and burnishing has been improved to meet the change so that the average particle size of abrasive grains used therein, which used to be the level of several µm, has now become more finer grains of not more than 0.3 µm.

However, the lapping film contains hard inorganic particles as an abrasive material, and in the case when irregular protrusions exist on the surface of a lapping film or when grain detachment, etc. occurs therein, the resulting defect is that scratches occur on the surface of the magnetic disk. Moreover, if detached grains remain on the surface of the disk, these grains might cause a serious defect in which they are embedded in the disk in the succeeding process.

Therefore, in recent years when the formation technique of the protective film has been improved, with respect to a film for surface-treating the protective film of a magnetic disk, a function for removing foreign matters by wiping them without causing scratches rather than for polishing the surface of the protective film has come to be required. Moreover, in the case when burnishing is carried out after formation of a lubricating film, the film needs to have an oil-absorbing characteristic in order to remove loose lubricant and render the lubricating film more uniform across the surface of the magnetic disk.

In other words, the quality required for a surface finishing material for the surface of a magnetic disk has come to change in response to the improvement of the film quality and changes in the processes in which it is used, and those materials which cause no scratches and can remove foreign matters and loose lubricant have come to be demanded. That is, although emphasis was put on the polishing function conventionally, emphasis now has been put on the removal of foreign-matter (wiping function).

Japanese Patent Laid-Open Publication No. 66179/1993 discloses a cleaning film for surface-treating a protective film of a magnetic recording medium. This cleaning film is made of a woven cloth with very thin fibers, and this is used for removing dust after the abrasive process using a lapping film. Therefore, it contains no abrasive grains, and causes no scratches on the surface of the magnetic disk. However, the very thin fibers tend to be cut due to tension and friction, and once they are cut, fiber particles come off from the woven cloth. Therefore, the application of this cleaning film instead of the lapping film causes a problem in which the treatment surface is contaminated by fiber. For this reason, cleaning films composed of woven cloth with very thin fibers have not been put into practical use yet as a material for treating a protective film surface of a magnetic recording medium.

The present invention provides a wiping film for removing foreign matter and loose lubricant, without scratching and without depositing fibrous debris on the treatment surface. The wiping film may be used in the treatment of magnetic disks and the like.

SUMMARY OF THE INVENTION

The invention provides a wiping film having a flexible film backing, and a wiping layer formed on one surface of the backing, the wiping layer composed of a binder and plastic particles dispersed therein.

BRIEF DESCRIPTION OF THE DRAWINGS

In describing aspect of the preferred embodiment, reference is made to the FIGURE wherein.

DETAILED DESCRIPTION OF THE PREFERRED EMBODIMENT

Figure 1:
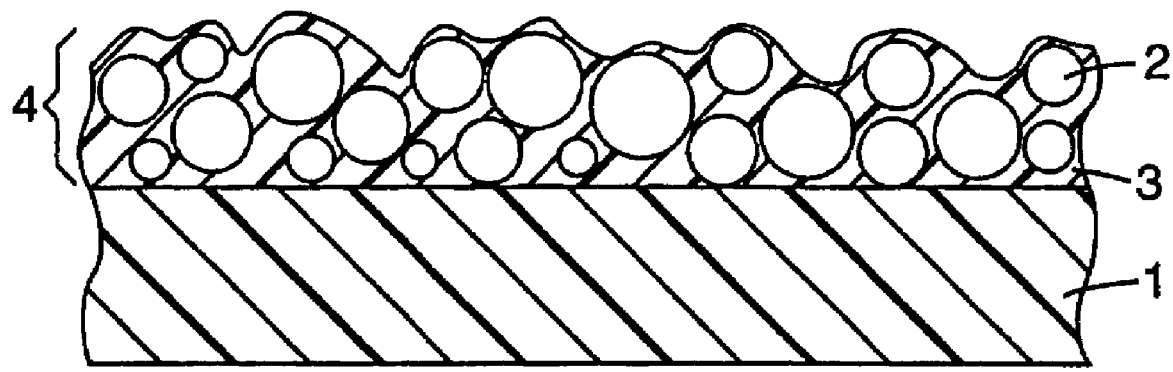
FIG. 1 is a cross-sectional view of an embodiment of a wiping film in accordance with the present invention.

FIG. 1 is a cross-sectional view of a wiping film according to the present invention. Plastic particles 2 are bonded to a surface of a film-shape backing 1 by a hardened binder resin 3 to provide a wiping layer 4. This wiping film is used for removing foreign matter and loose lubricant from the surface of a magnetic recording medium, that is, mainly from the surface of the magnetic disk so as to provide a uniform lubricating film formed on the surface of the magnetic disk.

Film Backing

The film backing is properly selected from polymer films that have sufficient strength resistant to tape cleaning and burnishing processes as well as strength and heat resistance to coating and drying processes during manufacturing processes, are less susceptible to dimensional change, and have flexibility. Polymer films conventionally used as lapping film backings are preferably used.

Examples of such polymer films, oriented or unoriented films, include, polyester resins such as polyethylene terephthalate, polybutylene terephthalate and polyethylene naphthalate; polyolefin resins such as high-density polyethylene and polypropylene; polystyrene, polyvinyl chloride, polyvinylidene chloride, polyvinyl alcohol, ethylene-vinylalcohol copolymer, polyacrylonitrile, polyamide, acrylic resins mainly composed of materials such as esters of acrylic acid, or esters of methacrylic acid; polyacetal, cellulose derivatives such as cellulose triacetate and cellulose diacetate; and polycarbonate. In particular, biaxial oriented films of polyethylene terephthalate and nylon and polyimide film are superior in the coating property of wiping film, post-processing property and handling in the actual machine, and are preferably used.

The film backing preferably have appropriate flexibility. For example this film backing has a bend elastic modulus of from 500 to 2000 kg/mm$^2$ measured according to JIS K 6911 by using a test piece having a thickness of 1 mm.

The film backing generally has a thickness of from 5 to 125 μm and more preferably, 14 to 75 μm.

Plastic Particles

In lapping films conventionally used for tape cleaning and burnishing processes on the surface of a magnetic recording medium, inorganic materials such as alumina have been used as components in the abrasive layer. However, in order to prevent scratches on the treatment surface, in the wiping film of the present invention, plastic particles, which are softer than the inorganic particles, are used. The combination of such plastic particles and a binder allows the surface of the wiping layer to have an uneven irregular structure, thereby providing functions for taking in fine foreign matters and particles and for absorbing loose lubricant, without causing scratches on the polishing treatment subject.

The plastic particles preferably have a hardness of M10 to M130 in the Rockwell hardness, more preferably, M85 to M105. When the Rockwell hardness of the plastic particles is less than M10, the plastic particles become flattened at the time of the application of the wiping film, making it impossible to maintain the irregular structure on the surface. In this case, it is not possible to obtain the wiping effect. Moreover, the Rockwell hardness exceeding M130 tends to cause scratches on the treatment surface.

Although not particularly limited, the plastic particles preferably have spherical shape. This shape prevents scratches from occurring on the treatment surface. With respect to the particle size, the average particle size is preferably in the range of 0.01 to 100 μm, more preferably, 0.1 μm to 10 μm. The average particle size less than 0.01 μm fails to form the irregularity corresponding to the surface roughness required in designing the surface of the wiping layer of the film. The average particle size exceeding 100 μm makes the surface roughness of the wiping layer of the film too high, resulting in degradation in the wiping function required for the product. In particular, it becomes difficult to take in fine particles in the orders of nm.

The material of the plastic particles is preferably selected from resins having a proper hardness. Examples of the material include: esters of polymethacrylic acid, polystyrene, polyolefin, phenolic resin, epoxy resin, acrylonitrile-butadiene-styrene resin, high-density polyethylene resin, urea resin, polyester resin, polyvinylchloride, polyamide and polycarbonate. Moreover, those materials obtained by subjecting these fine particles to a surface modifying treatment, etc., for example, those materials obtained by metal-coating these fine particles or introducing a functional group to these fine particles, may be used. Furthermore, inorganic particles, such as spherical glass or spherical ceramics, may be mixed into the above-mentioned plastic particles so as to allow the plastic particles to deposit certainly on the backing.

Commercially available plastic particles may be used. For example "CHEMISNOW (trade name)" made by Soken Chemical & Engineering Co., Ltd. is listed.

Binder

With respect to the binder, conventionally known thermoplastic resin, thermocuring resin, reactive-type resin, electronic-ray-curing resin, ultraviolet-curing resin, visible-light-curing resin, and a mixture of these may be used. Those materials that have been used as the binder of lapping films may be preferably used.

With respect to these binders, in the case of thermocuring type, those which can provide a hardness of 15 to 90, more preferably, 50 to 85, in the Shore D hardness after having been set at room temperature are preferably used.

In the case when thermoplastic resins are used as the binder, those having a softening temperature of not more than 150° C., an average molecular weight of 10000 to 300000, and a polymerization degree of at least 50 to 200, in particular, 200 to 700, may be preferably used.

More specifically, examples thereof include; vinylchloride-vinylacetate copolymer, vinylchloride copolymer, vinylchloride-vinylacetate-vinylalcohol copolymer, vinylchloride-vinylalcohol copolymer, vinylchloride-vinylidenechloride copolymer, vinylchloride-acrylonitrile copolymer, acrylate-acrylonitrile copolymer, acrylate-vinylidenechloride copolymer, acrylate-styrene copolymer, methacrylate-acrylonitrile copolymer, methacrylate-vinylidenechloride copolymer, methacrylate-styrene copolymer, urethane elastomer, nylon-silicon resins, nitrocellulose-polyamide resin, vinylpolyfluoride, vinylidenechloride-acrylonitrile copolymer, butadiene-acrylonitrile copolymer, polyamide resin, polyvinylbutyral, cellulose derivatives (cellulose acetate butyrate, cellulose diacetate, cellulose triacetate, cellulose propionate, nitrocellulose, ethyl cellulose, methyl cellulose, propyl cellulose, methylethyl cellulose, carboxymethyl cellulose, acetyl cellulose, etc.), styrene-butadiene copolymer, polyester resin, polycarbonate resin, chlorovinylether-acrylate copolymer, amino acid resin, various synthetic rubbers, thermoplastic resins, and mixtures thereof may be used.

In the case when thermocuring resins or reactive-type resins are used as the binder, the coating solution preferably has a molecular weight of not more than 200000, and those which have a molecular weight that becomes infinite by applying heat and humidifying them after having been coated and dried, through a reaction such as a condensing addition reaction. Moreover, among these resins, those which are not softened or molten until the resin has been thermally decomposed are preferably used.

More specifically, examples thereof include: phenolic resin, phenoxy resin, epoxy resin, polyurethane resin, polyester resin, polyurethane polycarbonate resin, urea resin, melamine resin, alkyd resin, silicone resin, acrylic reactive resins (electron-ray curing resin), epoxy-polyamide resin, nitrocellulose-melamine resin, a mixture of high molecular polyester resin and isocyanate prepolymer, a mixture of methacrylate copolymer and diisocyanate prepolymer, a mixture of polyester polyol and polyisocyanate, urea formaldehyde resin, a mixture of low molecular glycol/high molecular diol/triphenylmethane triisocyanate, polyamine resin, polyimine resin, etc. and a mixture of these.

With respect to a curing agent for the thermocuring resin, polyisocyanate is preferably used. Specific examples of polyisocyanate include: isocyanates such as tolylenediisocyanate, 4,4'-diphenylmethanediisocyanate, hexamethylenediisocyanate, xylylenediisocyanate, naphthylene-1,5-diisocyanate, O-toluidinediisocyanate, isophoronediisocyanate, and triphenylmethanetriisocyanate, or reaction products of these isocyanates and polyalcohol, or polyisocyanates of dimer to decamer produced by condensation of isocyanate chains, or products of polyisocyanate and polyurethane having isocyanate as a terminal functional group. The molecular weight of these polyisocyanates has a number average molecular weight of 100 to 20000.

Preparation of Wiping Film

The wiping film of the present invention is prepared as follows: a wiping layer containing plastic particles and a binder is formed on one surface of a backing film and this layer is cured. The wiping layer is generally formed by mixing and dispersing plastic particles so as to preliminarily prepare a coating solution, and applying this coating solution to the surface of a backing film so as to be dried thereon.

The plastic particles and the binder is preferably mixed in a weight ratio (particles/binder) of nonvolatile components (that is, at the state that solvents are excluded, for example, in case of examples, at the state that methyl ethyl ketone, and toluene are excluded) of 70/100 to 350/100, more preferably 100/100 to 200/100. When the mixture ratio is less than 70/100, most of the surface of the wiping layer of the film covered with the binder, a sufficient irregular structure required for the product is not achieved. When the mixture ratio is more than 350/100, the plastic particles are easily detached from the wiping layer.

Upon mixing, a plurality of kinds of binders may be combined and used, and, if necessary, conventional additive agents, such as a dispersant, a coupling agent, a lubricant, an antistatic agent, an antioxidant, a moldewproof agent, a colorant and a solvent, may be added thereto. The addition order of the respective components, the dispersing temperature (0 to 80° C.), etc. may preferably be controlled.

The addition order of the additives is, for example, that a coupling agent and a dispersing agent are added at the time when mixing of plastic particles and a binder are started, and a lubricant and an antistatic agent and the like are added coincidentally after uniform dispersion is formed. The dispersing temperature is for example determined in consideration of boiling point of a solvent contained in an coating solution. For example, dispersing process may be carried out with keeping at 20 to 50° C. in the case that methyl ethyl ketone or toluene are mainly employed as a solvent. The preparation of the coating solution may be carried out by using a conventional kneading machine.

With respect to the method for coating the backing film with the coating solution, after the viscosity of the coating solution has been appropriately adjusted, it is applied through the following methods: gravure coater, air doctor coater, blade coater, rod coater, knife coater, squeeze coater, impregnating machine, reverse roll coater, transfer roll coater, kiss roll coater, cast coating, spray coater, slot orifice coater (curtain coater, fountain coater), static powder coater, electrodeposition coating, powder electrodeposition coating, vacuum plating method, extrusion coater, micro replication method, PVD method, CVD method, and various vapor deposition methods.

Specific explanations of these methods are given in "Coating Systems" published by Maki Book Store (published on Oct. 30, 1979) and "New Trend of Thin-Film Techniques" published by Industrial Research Association (published on Jul. 15, 1997) on pages 65 to 135. Examples of a preferred viscosity of a coating liquid for application by using the various kinds of coating apparatus are as follows.

TABLE 1

| Coating apparatus | Viscosity (cps) |
| --- | --- |
| gravure coater | 50 to 10,000 |
| air doctor coater | 50 to 500 |
| blade coater | 1,000 to 50,000 |
| rod coater | 25 to 100 |
| knife coater | 500 to 10,000 |
| squeeze coater | 50 to 500 |
| reverse roll coater | 50 to 100,000 |
| transfer roll coater | 500 to 4,000 |
| kiss roll coater | 50 to 400 |
| cast coater | 30,000 to 50,000 |
| spray coater | 50 to 400 |
| curtain coater | 200 to 10,000 |
| fountain coater | not more than 100,000 |
| electrodeposition coater (only for binder) | 100 to 10,000 |
| extrusion coater | 50 to 100,000 |
| micro replication method | 10 to 100,000 |

The order of application of these coating solutions may be desirably selected, and prior to a coating by a desired solution, a base coating layer may be placed, or a corona discharging process, etc. may be applied in order to improve the adhesive strength to the film backing.

After the coating solution has been applied to the film backing, this is dried and the binder is cured so that a wiping film is obtained. The curing process of the binder is generally carried out by heating.

In the resulting wiping film, the wiping layer has a thickness of from 1 to 200 μm, more preferably 2 to 20 μm. The thickness of the wiping layer of less than 1 μm tends to cause an interlayer separation in the wiping layer formed on the backing. The thickness exceeding 200 μm causes a great amount of consumption of the materials such as the plastic particles and binder, in comparison with the resulting functions of the wiping layer, resulting in high costs of the film for this purpose.

Moreover, a surface of the wiping layer has a center line average surface roughness (Ra) of not more than 50 μm, more preferably 0.01 to 5 μm (cut off value: 80 μm). The value exceeding 50 μm causes the surface of the wiping layer of the film too rough. Here, in the wiping treatment subject such as a magnetic disk, it is demanded that the surface roughness is reduced to the nano level and further to the angstrom level, and in response to this demand, it is of course necessary for the surface roughness of the wiping layer of the film to be adjusted with high precision.

The features of the preferred embodiment are further illustrated in the following non-limiting examples.

EXAMPLES

A detailed explanation will be given of the present invention by means of the following examples; however, the present invention is not intended to be limited by these.

Here, in the examples, "part" and "%" refer to "parts by weight" and "% by weight" unless otherwise defined.

Example 1

Materials A to D, shown in Table 2, were put into a tank, and this was dispersed and kneaded for 60 minutes at 1800 rpm by using a high-speed mixer, and it was confirmed that the plastic particles had been uniformly dispersed. Thereafter, material E was added thereto, and further stirred for 15 minutes. Then, this was filtered, and a coating solution having a solid concentration of 35.0% was obtained.

TABLE 2

| | Materials of coating solution | Compounding amount (parts) |
|---|---|---|
| A) Resin fine particles | Polymethylmethacrylate high-crosslinking powder: made by Soken Chemical K.K., Trade name: Chemisnow -MR-2HG, Shape: spherical, Average particle size: 2 µm, Gel ratio: not less than 99%, True specific gravity: 1.19, Refractive index: 1.49 | 30.0 |
| B) Binder | Saturated polyester resin, Toyobo, Trade name: Vylon 65HS, Solid components: 35.5%, Solvent: MEK (32.5%) + TOL (32.5%), Tensile breaking strength: 57 g/cm$^2$, Tensile breaking extension: 720%, Hardness (D): 57, Specific gravity: 1.210, Limit viscosity: 0.77 dl/g, Molecular weight: 20000 to 25000, Tg: 14° C., Softening point: 128° C., Color: light yellow | 62.9 |
| C) Solvent | Methylethylketone | 28.7 |
| D) Solvent | Toluene | 29.0 |
| E) Curing agent | Polyisocyanate, Nippon polyurethane K.K., Trade name: Colonate-L, NCO content: 12.7 to 13.7%, Appearance: light yellow liquid, Viscosity (Gardner): W-Y, Specific gravity: 1.16 to 1.18, Solid components: 74.0 to 76.0%, Solvent: Ethylacetate | 1.0 |

With respect to the film backing, a polyethylene terephthalate (PET) film, made by Teijin K. K., having the following properties was employed: serial No.: G2-24, average thickness: 23.3 µm, breaking strength: longitudinal direction 28 kg/mm$^2$-lateral direction 29 kg/mm$^2$, breaking extension: longitudinal direction 125%-lateral direction 110%, surface roughness (Ra): 0.023 µm, thermal contraction rate (150° C.×30 minutes): longitudinal direction 1.8%-lateral direction 0.3%, haze: 3.0%, friction coefficient: stationary 0.35–moving 0.33.

The coating solution was applied to the surface of this film backing by using a direct gravure coating method. The application was set to an amount so as to form a thickness of the wiping layer of 6 µm after the curing process. Next, this was put in an atmosphere of 40 to 130° C. for 5 to 300 seconds so that the coated solution was dried, and the wiping layer was then cured. After the curing process, the surface roughness (Ra) of the wiping layer was measured, and the resulting value was 0.203 µm.

The resulting wiping film was set to a texturing polishing machine made by Hitachi Electronics Engineering K. K. Then, the surface of a 3.5 inch NI—P plated aluminum board was subjected to a wiping process under conditions shown in Table 3. The surface roughness of the board was measured before and after the process. Table 3 shows the results of the measurements.

TABLE 3

| | |
|---|---|
| Compressing pressure (linear pressure) | 13 g/mm |
| Film feed | 200 mm/min |
| Processing time | 60 seconds |

Comparative Example 1

The same processes as Example 1 were carried out except that a conventional lapping film (abrasive grains: aluminum oxide having an average particle size of 0.3 µn, Ra of abrasive layer surface: 0.045 µm) was used, so as to polish the surface of a 3.5-inch NI—P plated Al board.

The surface roughness of the board was measured before and after the process. Table 4 shows the results of the measurements.

Comparative Example 2

The same processes as Example 1 were carried out except that a conventional lapping film (abrasive grains: aluminum oxide having an average particle size of 1 µm, Ra of abrasive layer surface: 0.162 µm) was used, so as to polish the surface of a 3.5-inch NI—P plated Al board.

The surface roughness of the board was measured before and after the process. Table 4 shows the results of the measurements.

Comparative Example 3

The same processes as Example 1 were carried out except that a conventional lapping film (abrasive grains: aluminum oxide having an average particle size of 2 µm, Ra of abrasive layer surface: 1.56 µm) was used, so as to polish the surface of a 3.5-inch NI—P plated Al board.

The surface roughness of the board was measured before and after the process. Table 4 shows the results of the measurements.

TABLE 4

|  | Before polish | | After polish | |
| --- | --- | --- | --- | --- |
|  | Ra (nm) | Rz (nm) | Ra (nm) | Rz (nm) |
| Example | 2.3 | 24.3 | 2.3 | 22.9 |
| Comparative Example 1 | 2.3 | 24.3 | 3.1 | 45.3 |
| Comparative Example 2 | 2.3 | 24.3 | 6.4 | 80.4 |
| Comparative Example 3 | 2.3 | 24.3 | 10.3 | 115.1 |

In the case of the surface treatment carried out by the wiping film of the example, the surface roughness of the board was not changed before and after the treatment, and it was confirmed that the treatment surface was free from damages such as scratches.

The wiping film of the present invention does not contain inorganic particles nor fiber materials so that it generates neither scratches nor fiber dusts on the treatment surface. Moreover, it has an uneven irregular structure on the surface so that it is possible to remove foreign matters and loose lubricant from the treatment surface.

The invention claimed is:

1. A wiping film for treating the surface of a magnetic recording medium comprising:
    a flexible polymer film backing; and
    a wiping layer formed on a surface of the backing, the wiping layer comprising a binder with plastic particles dispersed therein, and the plastic particles having an average particle size in the range of 0.1 to 10 µm, wherein a surface of the wiping layer has a center line average surface roughness (Ra) in the range of 0.01 to 5 µm, and wherein the plastic particles and the binder are contained in a weight ratio of from 70/100 to 350/100.

2. The wiping film of claim 1, wherein the plastic particles have a Rockwell hardness in the range of M10 to M130.

3. A method of treating the surface of a magnetic recording medium comprising:
    applying to a surface of a magnetic recording medium a wiping film to clean the surface of the magnetic recording medium, the wiping film comprising:
    a flexible polymer film backing; and
    a wiping layer formed on a surface of the backing, the wiping layer comprising a binder with plastic particles dispersed therein, and the plastic particles having an average particle size in the range of 0.1 to 10 µm, wherein a surface of the wipinglayer has a center line average surface roughness (Ra) in the range of 0.01 to 5 µm.

* * * * *